3,540,841
PROCESS FOR THE PRODUCTION OF ANHYDROUS MAGNESIUM CHLORIDE
Heihachiro Fukuzawa, Kiyoaki Sese, and Saizaburo Maeda, Tokyo, and Hiromoto Mogi and Tomoyasu Ishida, Kita-Kyushu, Japan, assignors to Asahi Glass Co., Ltd., Tokyo, Japan
No Drawing. Filed May 7, 1968, Ser. No. 727,373
Claims priority, application Japan, May 8, 1967, 42/28,699
Int. Cl. C01f 5/30, 5/32
U.S. Cl. 23—91          5 Claims

ABSTRACT OF THE DISCLOSURE

Magnesium carbonate having the following composition $$m\text{MgCO}_3 \cdot n\text{Mg(OH)}_2 \cdot w\text{H}_2\text{O}$$

wherein $m=0.5-1.0$, $n=0.5-0$, $w=3.0-0$ and $m+n=1$ is brought into contact with hydrogen chloride or ammonium chloride in counter-current at a temperature of from 250° to 550° C. to give anhydrous magnesium chloride.

BACKGROUND OF THE INVENTION

Field of the invention

The present invention relates to a process for the production of anhydrous magnesium chloride. More particularly, this invention relates to a process of producing anhydrous magnesium chloride with high purity suitable for use in the electrolytic production of metallic magnesium from magnesium hydroxide obtainable from sea water by precipitation process and hydrogen chloride or ammonium chloride easily and in high purity.

Description of the prior art

It is publicly known to produce anhydrous magnesium chloride by chlorinating magnesium compound such as magnesium oxide, magnesium hydroxide or magnesium carbonate by chlorine gas. However, in the known process wherein chlorine gas is used as a chlorinating agent, a large quantity of carbon is not only necessary, but also the chlorinating reaction is required to be effected at high temperature (confer: Kirk-Othmer, "Encyclopedia of Chemical Technology," second completely revised edition vol. 12, p. 718.

In consequence, the magnesium chloride being produced comes to fused or molten state or sticky state and as known, there occur disadvantages which entrain various obstacles. Occurrence of fused state or sticky state not only makes the handling of reaction material remarkably difficult, but also render the continuation of reaction impossible wherein fluidized bed or moving bed is used, and in some cases the progress of reaction is impaired to lower the conversion. Further, in order to lower the reaction temperature, it is also proposed to substitute reducing gas for a part of carbon, but in this process, it is impossible to avoid the produced magnesium chloride from being contaminated with carbon as the reaction is effected at rather low temperature.

Furthermore, since the carbon contamination acts a role of impairment in the electrolytic production of metallic magnesium, the removal operation of carbon, which is satisfactory in industry, is required.

On the other hand, hydrogen chloride can also be adopted as a chlorination agent. In fact, in the production of magnesium chloride wherein contamination of basic magnesium chloride or hydrogenated magnesium chloride is tolerable, chlorination can be carried out by the use of hydrogen chloride or ammonium chloride. However, water to be produced at the time of reaction between hydrogen chloride and magnesium oxide, magnesium hydroxide or basic magnesium chloride impairs the production of anhydrous magnesium chloride. Accordingly, except for cases wherein hydrogen chloride is used merely as a reaction atmosphere, when anhydrous magnesium chloride is practically produced by the use of hydrogen chloride, the presence of a material capable of preventing effect of water, such as hydrogen sulfide, volatile sulfide, volatile hydroxides or the like is required. Further, when sulfide such as hydrogen sulfide or the like is used, the reaction conditions will become troublesome. A complicated reaction apparatus, in which a special material is used, is not only required, but also the purification operation for produced gas will be inevitably complicated.

BRIEF SUMMARY OF THE INVENTION

It is an object of the present invention to provide a process for producing anhydrous magnesium chloride by the use of hydrogen chloride or such a substance as ammonium chloride, which is capable of generating hydrogen chloride as a chlorinating agent without using sulfide and incurring a fused state or sticky state.

Another object of this invention is to provide a process for the production of anhydrous magnesium chloride suitable for producing anhydrous magnesium chloride which is fitted for making metallic magnesium by electrolytic process.

Still another object of this invention is to provide a cyclic process in which ammonium gas and carbonic acid gas by-produced when ammonium chloride is adopted as a chlorinating agent are utilized for an improved ammonia soda process, while on the other hand, ammonium chloride obtained is utilized for the production of anhydrous magnesium chloride.

A further object of this invention is accomplished by bringing magnesium carbonate represented by the following general formula into contact with hydrogen chloride gas or ammonium chloride gas in counter-current at a maximum reaction temperature of from 250° to 550° C. and reacting with each other.

$$m\text{MgCO}_3 \cdot n\text{Mg(OH)}_2 \cdot w\text{H}_2\text{O}$$

wherein $m=0.5-1.0$, $n=0.5-0$, $w=3.0-0$ and $m+n=1$
Other objects and advantageous features will be apparent from the following description of the invention.

DETAILED DESCRIPTION INCLUDING PREFERRED EMBODIMENTS

At the time when magnesium chloride is produced by bringing magnesium oxide or magnesium hydroxide into contact with a chlorinating gas, high temperatures are required and as a result, it was usually impossible to avoid the magnesium chloride becoming molten or sticky, and chlorination in the temperature range not incurring fused state or sticky state terminates in the production of basic magnesium chloride.

The present inventors have executed numerous experiments and studies for the purpose of finding magnesium compounds, which do not terminate in the production of basic magnesium chloride and are capable of producing magnesium chloride sufficiently, by carrying out the chlorination in a temperature range not incurring the fused state or sticky state, and found that said purpose can be accomplished by the use of magnesium chloride having a specific composition.

Further, according to the present invention, it has also been found that when magnesium carbonate also is reacted under specific conditions, anhydrous magnesium chloride can easily be produced at a temperature as low as 250° to 550° C. which does not incur a fused state or sticky state.

In particular, when magnesium hydroxide obtainable from sea water is used as starting material, magnesium hydroxide is once converted into magnesium carbonate expressly without directly effecting the chlorination as in case of the use of chlorine as chlorinating agent, and it has been recognized that this magnesium carbonate can produce anhydrous magnesium chloride rather easily by chlorinating said magnesium carbonate by the use of hydrogen chloride or ammonium chloride.

Furthermore, a large quantity of boron compounds are usually contained in magnesium hydroxide obtainable from sea water efficiently and consequently, when such magnesium hydroxide is used as starting material for the production of metallic magnesium, it is needed to previously remove boron compounds by a complicated means. Also, in order to produce magnesium hydroxide from sea water without mingling with boron compounds, for example an excess amount of alkali is required, as disclosed in U.S. Pat. No. 2,405,055. Consequently, the sedimentation velocity of magnesium hydroxide is extremely slow. However, according to the experiments and studies made by the present inventors, it has also been found that by converting magnesium hydroxide containing boron compounds once into magnesium carbonate, the boron compound content can be lowered at the conversion stage to the extent that metallic magnesium may be produced satisfactorily.

Further, in the case where magnesium hydroxide is chlorinated by hydrogen chloride, a considerably large quantity of reaction heat is generated in the stage of the production of basic magnetic chloride. On the contrary, in the case where magnesium carbonate is chlorinated, heat quantity generated in the production stage of basic magnesium chloride becomes low. As a result, control of reaction temperature has been found to be easy.

Furthermore, in the case where magnesium carbonate is used as raw material, the above-mentioned advantages are obtainable. In addition thereto, in particular, in the case where ammonium chloride is adopted as a chlorinating reagent, the gas being generated in the chlorinating stage contains merely carbon dioxide and ammonia. In consequence, this gas can be used cyclically in the stage of the cyclic Ammonia Soda process for repeated production of ammonium chloride, with the result that anhydrous magnesium chloride can be produced extremely reasonably.

Thus, according to the present invention, magnesium carbonate represented by the following general formula is brought into counter-current contact with hydrogen chloride gas or ammonium chloride gas at a maximum temperature of 250° to 550° C. and put into reaction:

$$mMgCo_3 \cdot nMg(OH)_2 \cdot wH_2O$$

(wherein $m=0.5-1.0$, $n=0.5-0$, $w=3.0-0$ and $m+n=1$)

In the following, each step for the production of anhydrous magnesium chloride according to the present invention will be described concretely in connection with an instance using hydrogen chloride as a chlorinating reagent.

In general, the reaction of hydrogen chloride with magnesium compounds, such as magnesium oxide, magnesium hydroxide or MgCO$_3 \cdot$3H$_2$O is exothermic reaction.

Further, the reason why the above reaction cannot be adopted as a process for the production of anhydrous magnesium chloride resides in the following actual facts: That is to say, as described above, in this reaction, not only water is by-produced but heat value is also high so that the control of reaction is difficult.

Detailed studies on such reaction operation showed that, since in conventional known processes, both magnesium compound and hydrogen chloride have been caused to react with each other desultorily, exothermic reaction shown in the under-mentioned Equation 1 and endothermic reaction shown in the Equation 2 take place in parallel and consequently, not only the control of reaction temperature becomes difficult and the partial overheat phenomenon occurs, but also the reverse reaction of the reaction represented by Equation 2 occurs.

  (1)
  (2)

In the case where magnesium carbonate is adopted as magnesium compound, not only calorific value is low in comparison with the case where magnesium oxide or magnesium hydroxide is used, but also the following advantages can be obtained when the carbonate is brought into contact with hydrogen chloride gas in counter-current; namely, (i) Since magnesium chloride produced comes successively in contact with the reaction gas containing low water and then with anhydrous reaction gas at the end of the reaction furnace, the production of anhydrous magnesium chloride becomes possible although it is a reaction wherein water is by-produced.

(ii) Since the reaction of magnesium carbonate can be effected successively, the reaction zone can be divided into the exothermic and endothermic zones and consequently, the control of reaction temperature can easily be effected.

(iii) Since in the zone represented by Equation 1 wherein exothermic reaction occurs the concentration of hydrogen chloride is reduced below half, there is no fear that the reaction proceeds rapidly.

(iv) Since diluted hydrogen chloride comes in contact with fresh magnesium carbonate, the conversion of hydrogen chloride can be made sufficiently high.

Moreover, since the control of reaction temperatures can be accomplished by adjusting the temperature of chlorinating reagent to be blown in, for instance, a cooling jacket can be provided around the exothermic zone, or dry air or inert gases can be blown in. When a temperature of 350° to 550° C. is used as reaction temperature, the reaction can be caused to proceed without incurring fused state or sticky state and moreover, at an industrially satisfactory velocity. In particular, the adoption of the reaction temperature of 400° to 450° C. provides the most desirable purity and yield of anhydrous magnesium chloride.

The relation between the reaction temperature and the chlorinating reagent will be described in the following. The quantity of the chlorinating reagent used at the temperature of 250° C. is two times the stoichiometric quantity required to convert magnesium carbonate into magnesium chloride, that at the temperature of 300° C. is 1.3 times said stoichiometric quantity and further at the temperature of 350° C. it is a quantity equal to the above stoichiometric quantity.

The results as described above can be accomplished by using magnesium carbonate represented by the following general formula:

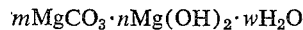

(wherein $m=0.5-1.0$, $n=0.5-0$, $w=3.0-0$ and $m+n=1$).

When $n$ is larger than 0.5, the calorific value becomes higher and consequently, it becomes inappropriate. On the other hand, when $w$ becomes larger than 3, it becomes difficult to obtain magnesium chloride in a substantially anhydrous state and consequently, it is not suitable. Magnesium carbonate having a composition: $m=0.75-0.92$, $n=0.25-0.08$, $w=0.1-0.24$ and $m+n=1$, is particularly easy in the temperature control and does not present any sticky state and thus, chlorinating reaction can proceed smoothly.

Such magnesium carbonate can be produced by any suitable means. However, since magnesium resources with high purity are being exhausted in the world, it is appropriate to produce said magnesium carbonate by the carbonation of magnesium hydroxide obtainable from sea water.

Originally, magnesium hydroxide obtainable from sea water has a relatively high content of boron compound, because it is very easy to absorb the boron compound. Consequently, in the case where magnesium chloride is produced from magnesium hydroxide which contains such boron compound, it has hitherto been considered as extremely difficult to reduce the boron compound content to below such an extent that magnesium chloride containing boron compound may be used in electrolysis without any trouble.

However, it has been found that when such magnesium hydroxide is converted into magnesium carbonate, the elimination of boron compounds is easily possible by mere washing or cleaning.

According to the experiments and studies made by the present inventors, it has also been found that at the time when magnesium hydroxide is converted into magnesium carbonate, magnesium hydroxide to be converted is used after being diluted with water, thereby the quantity of boron compounds contained in the converted magnesium carbonate is further reduced.

Thus, it is desirable to dilute magnesium hydroxide to be used with water to the order of from 15 gm./l. to 70 gm./l., computed in terms of MgO.

The reason why boron compound is removed is not necessarily evident. However, it is assumed due to the fact that under the pH-condition for carbonation, boron compound becomes easy to be dissolved out, while simultaneously, the boron compound content is deliberated from magnesium hydroxide in the crystallization process of magnesium carbonate. In addition, in the case where the above-mentioned process is adopted, of both quick lime and carbonic acid gas obtained by the thermal decomposition of limestone, the former, quick lime is used effectively for the production of magnesium hydroxide from sea water, and the latter, carbonic acid gas is effectively utilized for the carbonization of magnesium hydroxide and consequently, the adoption of the above process is extremely convenient.

In the production of magnesium hydroxide, a well-known manner is adopted, wherein milk of lime is caused to react with sea water free from carbonate ion and bicarbonate ion, and for calcium hydroxide, milk of lime or lime water is adequately used.

In this case, the use of an excess of calcium hydroxide with respect to magnesium ion contained in sea water increases the content of calcium compound and calcium ion in magnesium hydroxide produced. The incorporation of a large quantity of calcium content into magnesium hydroxide comes to be an obstacle for electrolysis for obtaining metallic magnesium from magnesium hydroxide produced by using said calcium.

In consequence, the quantity of calcium hydroxide to be used may be a quantity just sufficient to convert magnesium ion normally existing in sea water into magnesium hydroxide. The desirable quantity of calcium content with respect to magnesium is shown in a mol ratio, computed in terms of oxide, namely, CaO/MgO is 0.6 to 1.0.

Magnesium carbonate having a composition suitable for the practice of the present invention is preferably prepared by the following process.

That is to say, magnesium hydroxide slurry produced by the process as described above is once converted into $MgCO_3 \cdot 3H_2O$ by blowing carbonic acid gas thereinto, and the resulting $MgCO_3 \cdot 3H_2O$ is usually washed with water. $MgCO_3 \cdot 3H_2O$ after having been washed is dried or calcined at 100° to 250° C. for 1 to 2 hours. In order to facilitate the handling and reaction operation at the time when magnesium carbonate thus obtained is chlorinated with hydrogen chloride or ammonium chloride, it is appropriate to form said magnesium carbonate into granules in the order of from about 5 mm. to 10 mm., and the time of the forming is not limited, but it is appropriate to do so prior to the drying or calcinating operation as referred to above.

At the time of the reaction between the magnesium carbonate thus prepared and chlorinating reagent, such as hydrogen chloride or ammonium chloride, any suitable reaction system can be adopted insofar as the counter-current contact between said two substances is possible. However, magnesium carbonate is moved in a longitudinal or transversal type reaction furnace or reactor gradually and continuously, while chlorinating reagent is introduced counter-currently to said carbonate and they are brought into contact with each other and put into reaction.

Furthermore, hydrogen chloride or ammonium chloride can be gasified in any suitable manner and also carried forward by nitrogen or carbonic acid or the like gas.

Anhydrous magnesium chloride obtainable by the reaction can be used as raw material for the electrolysis for producing metallic magnesium and chlorine. Further, the resulting anhydrous magnesium chloride can be converted into magnesium oxide and chlorine by contact with oxygen or air current.

On the other hand, by-produced carbonic acid gas, or carbonic acid gas and ammonia gas are separated into carbonic acid gas and ammonia gas, as desired and it is possible to use them for any suitable applications.

However, when carbonic acid gas and ammonia gas are used cyclically as raw materials for the cyclic ammonia soda process for the simultaneous production of sodium bicarbonate and ammonium chlorides, these substances can be directly utilized with unreacted ammonium chloride mingled as it is; and further, since by-product materials in both the process according to the present invention and said ammonia soda process can be utilized cyclically repeatedly, it is particularly appropriate.

The cyclic ammonia soda process means the following circulating process:

To a mother liquor from which sodium bicarbonate was separated, that is, a sodium bicarbonate-separated mother liquor is added ammonia, which is in an amount necessary to prevent the co-precipitation of sodium bicarbonate in the resulting crystalline ammonium chloride and moreover which is in an amount necessary for the whole of cycle, and subsequently, sodium chloride is added to the mother liquor and the resulting mixture is then cooled. Crystalline ammonium chloride is crystallized (hereinafter shortly referred to as ammonium chloride crystallization process) and separated. Thereafter, carbonic acid gas is introduced into a mother liquor from which ammonium chloride was separated, that is, an ammonium chloride-separated mother liquor and then crystalline sodium bicarbonate is crystallized (hereinafter briefly referred to as sodium bicarbonate crystallization process) and then sodium bicarbonate is separated and sodium bicarbonate-separated mother liquor is obtained. Each process is carried out alternately and continuously (confer: Kirk-Othmer: "Encyclopedia of Chemical Technology" Second Edition, vol. 1, pp. 734 to 739). The quantity of ammonia required for the cycle as described above is equal to that of ammonia which was taken out as crystalline ammonium chloride.

A gas mixture consisting of carbonic acid gas and ammonia gas by-produced with the production of anhydrous magnesium chloride according to the present invention may be suitably added, intact or after being isolated, to ammonium chloride crystallization process which includes the above described ammonia gas and/or sodium bicarbonate crystallization process.

However, it is desirable to add the gas mixture by-produced to the ammonium chloride crystallization process from the following reasons: the partial pressure of carbonic acid gas contained in the sodium bicarbonate-separated mother liquor is considerably high and carbonic acid gas usually can no more be absorbed, whereas the partial pressure of ammonia gas is far low. For this reason, when as gas mixture by-produced is added to sodium bicarbonate-separated mother liquor, ammonia gas is selectively absorbed, but carbonic acid gas cannot be absorbed and is separated as gas.

In practice, ammonia gas and carbonic acid gas by-produced in the production of magnesium chloride can be used as a part or whole of ammonia and carbonic acid gas which are required in the cyclic ammonia soda process. Thus, ammonia chloride and sodium bicarbonate can be smoothly produced without mixture of undesirable compounds.

The invention is further described in the following examples which are illustrative but not limitative thereof.

*Example 1.*—Limestone was calcined in a lime kiln and quick lime was obtained. To the resulting quick lime was added water and thus there was obtained a calcium hydroxide solution (lime water) having the concentration of 1.26 gms./l., computed in terms of CaO. The calcium hydroxide solution thus obtained was reacted with sea water free from carbonate ion (MgO concentration, 2 gms./l.) at the rate of 218 l./100 l. To produce magnesium hydroxide, boron (B/MgO) contained in the magnesium hydroxide being 913 p.p.m. After filtration, the magnesium hydroxide obtained was washed with water. This magnesium hydroxide was then suspended in water and diluted to the concentration of 50 gms./l., computed in terms of MgO. Carbonic acid gas obtained from the lime kiln was blown into magnesium hydroxide slurry at 40° to 50° C. As a result, magnesium hydroxide was converted into magnesium carbonate ($MgCO_3 \cdot 3H_2O$), precipitate of magnesium carbonate thus obtained was filtered. Subsequently, the magnesium carbonate was granulated by a known granulator into granules of about 5 to 7 mm. diameter. Granulated magnesium carbonate was calcined in the air at about 250° C. for 2 hours.

Boron (B/MgO) contained in the obtained magnesium carbonate was 95 p.p.m. and said carbonate had the following composition:

$$0.92\ MgCO_3 \cdot 0.08\ Mg(OH)_2 \cdot 0.24\ H_2O$$

Magnesium carbonate thus prepared was charged continuously from above into a cylindrical furnace having an inner diameter of 100 mm. and a height of 2 m. at a temperature of 200° C. at the rate of 3 kg./hr. (computed in terms of MgO), and the magnesium carbonate was allowed to flow down by gravity while forming a moving bed.

On the other hand, hydrogen chloride gas, which was heated to 400° C., diluted with nitrogen and carbonic acid gas and the concentration of 50%, was introduced into the furnace from below at the rate of 5.5 kg./hour. Magnesium carbonate is chlorinated, and small pipes are provided horizontally toward the inside direction around the periphery of the furnace wall at a position of 0.7 meter from the top of the furnace. Simultaneously with the start of chlorination, nitrogen gas at about 200° C. is introduced into said pipes, at which time the temperature of the furnace is controlled so as not to rise to the temperature above about 450° C. due to heat of reaction.

Magnesium chloride thus produced is continuously withdrawn by means of a table feeder provided at the lower part of the furnace. The purity of magnesium chloride obtained was 98.5%.

No hydrogen chloride was seen in carbonic acid gas recovered from the upper part of the furnace. Further, magnesium chloride obtained did not show any sticky state and was in the same shape as the granules of magnesium carbonate introduced as raw material.

Furthermore, boron of about 30 p.p.m. remained in anhydrous magnesium chloride obtained, but such a quantity does not give any obstacles for the production of metallic magnesium by electrolysis.

*Example 2.*—Magnesium hydroxide was produced similarly as in Example 1 and boron (B/MgO) contained in the resulting magnesium hydroxide was 913 p.p.m. The magnesium hydroxide was then suspended in water and diluted to the concentration of 15 gms./l., computed in terms of MgO. The diluted magnesium hydroxide was brought into contact with carbonic acid gas at about 45° C., and $MgCO_3 \cdot 3H_2O$ thus obtained was filtered and washed with water. Subsequently, the washed magnesium carbonate was then granulated into granules of approximately 8 mm. to 10 mm. diameter by a known granulating machine and the magnesium carbonate thus granulated was calcined in the air at about 240° C. for 1.5 hours. Boron (B/MgO) contained in the magnesium carbonate obtained was 59 p.p.m. and the magnesium carbonate had the following composition:

$$0.80\ MgCO_3 \cdot 0.20\ Mg(OH)_2 \cdot 0.22\ H_2O$$

Magnesium carbonate thus prepared was continuously introduced from above into a cylindrical furnace of vertical type having 400 mm. inner diameter and 5 m. height at 200° C. at the rate of 40 kg./hour (computed in terms of MgO), and allowed to flow down by gravity from the upper portion of said furnace, while forming a moving bed.

On the other hand, hydrogen chloride gas of 30% concentration, which was heated to 450° C. and diluted by nitrogen and carbonic acid gas, was introduced into the furnace at the rate of 71 kg./hour from below and the magnesium hydroxide was chlorinated. A jacket was provided at a position of 0.7 meter from top of the furnace surrounding the outer periphery of the furnace wall. Simultaneously with the start of chlorination, combustion gas at 250° C. is passed through said jacket, at which time the temperature is controlled so as not to rise to the temperature above about 450° C. due to heat of reaction. The magnesium hydroxide produced is continuously taken out by means of a table feeder provided at the lower part of the furnace.

The purity of magnesium chloride was 98%.

The presence of hydrogen chloride in carbonic acid gas recovered from the upper part of the furnace was not seen. Further, the magnesium chloride obtained did not show any sticky state and was in the same shape as that of granule of magnesium carbonate introduced as raw material.

*Example 3.*—$MgCO_3 \cdot 3H_2O$ was prepared similarly as in Example 1 and granulated into granules of about 8 to 10 mm. diameter by a granulator. These granules were calcined in the air at about 240° C. for 2 hours. Magnesium carbonate obtained had the following composition:

$$0.78\ MgCO_3 \cdot 0.22\ Mg(OH)_2 \cdot 0.24\ H_2O$$

Magnesium carbonate thus prepared was continuously introduced from above into a cylindrical furnace of vertical type having an inner diameter of 400 mm. and a height of 4 meters at the rate of 70 kg./hour (computed in terms of MgO) at 200° C. and the magnesium carbonate was allowed to flow down by gravity while forming a moving bed.

On the other hand, silica sand of a particle size of 50 Tylar mesh is filled on a lattice plate provided at the lower part of a cylindrical device having an inner diameter of 1 meter and capable of being heated externally and the temperature of the filled layer is maintained at about 400° C. Carbonic acid gas is supplied to said filled layer from below and the silica sand is kept in a fluidized state. Ammonium chloride crystals produced by cyclic ammonia soda process were introduced into the silica sand kept in a fluidized process at the rate of 190 kg./hour. Ammonium chloride is gasified and carried on by carbonic acid gas at about 400° C. introduced into the furnace from below. Ammonium chloride is counter-currently brought into contact with the gasified ammonium chloride and gradually flows down by gravity while being chlorinated. Further, small pipes are provided horizontally toward the inside direction around the periphery of the furnace wall at a position of 1.5 meters from the top of the furnace and simultaneously with the start of chlorination, carbonic acid gas at about 200° C. was introduced into said pipes and the temperature is controlled so as not to rise to the temperature above about 450° C. due to heat of reaction. Magnesium chloride thus produced is continuously withdrawn by means of a table feeder provided at the lower part of the furnace.

The purity of magnesium chloride obtained was 98.7%. A gas mixture of ammonia gas of 54 kg./hr. and carbonic acid gas of 204 kg./hr. came out from the top of the furnace. Magnesium chloride obtained does not show any sticky state and was in the same shape as that of granule of magnesium carbonate introduced as raw material.

Gas thus coming out was absorbed in the mother liquor from which sodium bicarbonate was separated, i.e., sodium bicarbonate-separated mother liquor together with ammonia gas of 684 Nm.³/hour. However, carbon dioxide contained in the above described gas is not absorbed in the mother liquor. Thereafter, the liquor was cooled to about 20° C. and added with common salt (NaCl) at the rate of 1.85 tons/hour. Thus, ammonium chloride was produced at the rate of 1.7 tons/hour. Crystals of ammonium chloride produced are separated and after drying, reused as chlorinating gas for producing ammonium chloride.

On the other hand, carbon dioxide contained in the aforesaid coming out gas and carbon dioxide generated at the time when limestone is calcined and quick lime is produced, were at the rate of 1360 m.³/hour, absorbed in the mother liquor from which ammonium chloride was separated, i.e., ammonium chloride-separated mother liquor and crystals of sodium bicarbonate were deposited. The deposited sodium bicarbonate are separated and utilized for the production of soda ash or others. Ammonium bicarbonate and ammonia gas which were produced in the production of magnesium chloride were absorbed again in the mother liquor from which sodium bicarbonate was separated and thus the circulating steps are established.

What we claim is:

1. A process for the production of anhydrous magnesium chloride, which comprises bringing magnesium carbonate having the following composition:

$$m\text{MgCO}_3 \cdot n\text{Mg(OH)}_2 \cdot w\text{H}_2\text{O}$$

wherein $m=0.75$ to $0.92$, $n=0.25$ to $0.08$, $w=0.1$ to $0.24$ and $m+n=1$ into contact with at least one chloride selected from the group consisting of hydrogen chloride and ammonium chloride in counter-current at a maximum temperature of 250° to 550° C. to chlorinate the magnesium carbonate.

2. A process as claimed in claim 1, wherein magnesium carbonate is a product which is obtained by calcining MgCO₃·3H₂O at a temperature of from 100° to 250° C.

3. A process as claimed in claim 1, which comprises the steps of
   (a) reacting sea water with calcium hydroxide to produce magnesium hydroxide;
   (b) bringing the resulting magnesium hydroxide into contact with carbonic acid gas to convert the magnesium hydroxide into MgCO₃·3H₂O;
   (c) calcining the MgCO₃·3H₂O at a temperature of from 100° to 250° C. to produce magnesium carbonate having the following composition:

$$m\text{MgCO}_3 \cdot n\text{Mg(OH)}_2 \cdot w\text{H}_2\text{O}$$

wherein $m=0.75$ to $0.92$, $n=0.25$ to $0.08$, $w=0.1$ to $0.24$ and $m+n=1$; and
   (d) bringing said calcined magnesium carbonate into counter-current contact with at least one gaseous chloride selected from the group consisting of hydrogen chloride and ammonium chloride at a maximum temperature of from 250° to 550° C. to chlorinate the magnesium carbonate.

4. A process as claimed in claim 1, which comprises the steps of:
   (a) reacting sea water with calcium hydroxide to produce magnesium hydroxide, wherein a mol ratio of calcium to magnesium contained in sea water, computed in terms of oxide, CaO/MgO is 0.6 to 1.0;
   (b) diluting the resulting magnesium hydroxide to 15 gms./l. to 70 gms./l., computed in terms of MgO;
   (c) bringing the diluted magnesium hydroxide into contact with carbonic acid gas to convert the magnesium hydroxide into MgCO₃·3H₂O;
   (d) calcining the MgCO₃·3H₂O at a temperature of 100° to 250° C. to produce magnesium carbonate having the following composition:

$$m\text{MgCO}_3 \cdot n\text{Mg(OH)}_2 \cdot w\text{H}_2\text{O}$$

wherein $m=0.75$ to $0.92$, $n=0.25$ to $0.08$, $w=0.1$ to $0.24$ and $m+n=1$; and
   (e) bringing the calcined magnesium carbonate thus obtained into counter-current contact with at least one chloride selected from the group consisting of hydrogen chloride and ammonium chloride at a maximum temperature of from 250° to 550° C. to chlorinate said magnesium carbonate.

5. A process for the production of anhydrous magnesium chloride which comprises the steps of
   (a) bringing magnesium carbonate having the following composition:

$$m\text{MgCO}_3 \cdot n\text{Mg(OH)}_2 \cdot w\text{H}_2\text{O}$$

wherein $m=0.75$ to $0.92$, $n=0.25$ to $0.08$, $w=0.1$ to $0.24$ and $m+n=1$ into counter-current contact with gaseous ammonium chloride at a maximum temperature of from 250° to 550° C. to chlorinate the magnesium carbonate;
   (b) utilizing carbonic acid gas and ammonia gas by-produced at the time of chlorination of the magnesium carbonate in the above step (a) in a cyclic process, wherein carbonic acid gas, ammonia gas and sodium chloride are added consecutively, and sodium bicarbonate is precipitated by the addition of carbonic acid gas, and ammonium chloride is precipitated by cooling after addition of sodium chloride; and
   (c) recycling the ammonium chloride produced in the above step (b) to the aforesaid chlorination step (a).

References Cited

UNITED STATES PATENTS

| | | | |
|---|---|---|---|
| 1,771,628 | 7/1930 | Hirstel | 23—91 |
| 1,893,047 | 1/1933 | Barrett | 23—91 XR |
| 2,012,098 | 8/1935 | Haase et al. | 23—91 XR |
| 2,139,934 | 12/1938 | Chesny | 23—67 |
| 2,144,339 | 1/1939 | Laist | 23—91 XR |
| 2,342,666 | 2/1944 | Heath et al. | 23—91 |
| 2,580,168 | 12/1951 | Gloss | 23—67 |
| 3,347,625 | 10/1967 | Kimberlin et al. | 23—91 |

EDWARD STERN, Primary Examiner

U.S. Cl. X.R.

23—64, 67, 100